March 14, 1967   S. J. CISLO ET AL   3,308,901

DRIVE SHAFT TRAVEL LIMITING DEVICE

Filed June 25, 1965

STANLEY J. CISLO
CLARK A. TEA
INVENTORS

BY John R. Faulkner
Clifford L. Sadler

ATTORNEYS

United States Patent Office 3,308,901
Patented Mar. 14, 1967

3,308,901
DRIVE SHAFT TRAVEL LIMITING DEVICE
Stanley J. Cislo, Detroit, and Clark A. Tea, Southfield, Mich., assignors to Ford Motor Company, Dearborn, Mich., a corporation of Delaware
Filed June 25, 1965, Ser. No. 466,882
7 Claims. (Cl. 180—70)

The present invention relates generally to driveline constructions for motor vehicles, and more particularly to a device for limiting the vertical travel of a vehicle's drive shaft.

In the conventional passenger car, the rear wheels are rotatably supported at the outer ends of a rigid transversely extending axle housing. A longitudinally extending drive shaft is connected to differential gearing that is situated within the axle housing. This gearing, in turn, feeds driving torque through axle shafts within the housing to the driving wheels. The chassis of the vehicle is supported by the suspension system on the axle housing. The axle housing and drive shaft are free to traverse a vertical jounce and rebound path due to the flexibility of the suspension system.

In order to prevent the differential housing from crashing into the underbody of the vehicle upon extreme jounce conditions, a rubber bumper is interposed between the vehicle frame and the axle housing. During acceleration, the axle housing is subjected to a torque reaction that tends to rotate the housing about a transverse axis. This condition is known as axle windup. When the suspension is of the Hotchkiss type having longitudinal leaf springs, the springs will tend to distort into an ogee under such conditions.

In order to prevent engagement of the nose of the differential housing with the underbody of the vehicle upon extreme jounce deflection at the time of maximum axle windup, a rubber bumper is usually attached to the underbody where it will contact the differential. These rubber bumpers have a generally pointed shape with a height of about two or three inches. Without the bumper, the differential housing would have a free travel of from three to four inches. When the bumper is interposed, the limit of the jounce free travel is reduced to about one or two inches.

Upon a combination of axle windup and jounce, the differential strikes the rubber bumper and the spring rate rapidly increases as the rubber piece becomes loaded and compressed. When the nose bumper strikes the differential, the leaf springs will tend to straighten out.

The normal solid axle leaf spring suspension provides axle bumpers at the frame kickups to control pure jounce. The nose bumper at the differential is provided to control the combination of jounce and axle windup.

In view of the foregoing state of the art, it is an object of the present invention to provide a drive shaft jounce travel limiting device of simplified construction which increases the amount of free travel of the differential and drive shaft.

Normally the propeller shaft will hit the floor before the axle hits the frame. As stated previously, the bumper provided at the nose of the differential reduces free travel in jounce from approximately four inches to one inch. With a travel limiting device according to the present invention, the free travel of the differential may be increased two inches from the heretofore conventional one inch by arresting movement of the propeller shaft within a fraction of an inch of the floor pan.

More specifically, it is the presently preferred object of the present invention to provide an embodimnt in which a rubber bumper pad is secured to the floor pan or other underbody member of the vehicle and which has a low friction plastic face that is adapted to be struck by the rotating propeller shaft upon a combination of jounce and acceleration. Because the propeller shaft has a full two or three inches of free travel, the low friction face is not engaged very often. This contributes to its long life.

The many objects and advantages of the present invention will become amply apparent from the following discussion and the accompanying drawings in which.

Figure 1:
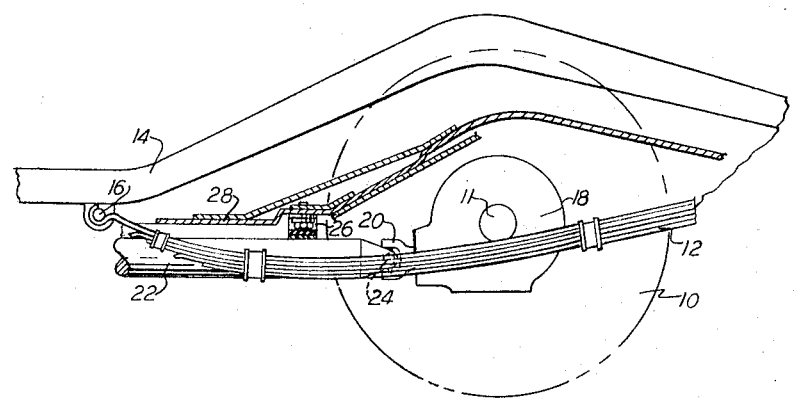
FIGURE 1 is a side elevational view of a rear suspension for a motor vehicle having a drive shaft limiting device constructed in accordance with the preferred embodiment of the invention.

Referring now to the drawings for a more complete understanding of the invention, FIGURE 1 shows a vehicle rear suspension system in which a road wheel 10 is rotatably supported at the outer end of a rigid axle housing 11 in a conventional fashion. A leaf spring 12 is rigidly connected near its midpoint to the axle housing 11 and at its forward and rear ends to a frame member 14 of the vehicle. The forward end of the leaf spring 12 is provided with an eye for attachment to a frame bracket 16.

Positioned at a midpoint in the axle housing 11 is a differential housing 18 which contains differential gearing for distributing power from its intake pinion shaft 20 to the left and right road wheels 10. A drive shaft 22 has its rear end connected to the pinion shaft 20 by a universal joint 24. The forward end of the drive shaft 22 is connected to the power plant of the vehicle and receives driving torque therefrom.

The chassis of the vehicle including the frame 14 is resiliently supported on the axle housing 11 and wheels 10 by the leaf spring 12. The unsprung components including the differential housing 18 are free to traverse a jounce and rebound path relative to the frame due to the presence of the spring 12. In order to limit the upward deflection of the differential housing 18 and the propeller shaft 22 during jounce and during acceleration of the wheels, a drive shaft limiting device 26 is provided. During jounce, the differential housing 18 moves upwardly with respect to the chassis. During acceleration, torque reaction tends to turn the differential housing 18 in a clockwise direction as viewed in FIGURE 1. This causes the nose portion of the differential and the drive shaft 22 which is connected thereto to move upwardlly. The drive shaft limiting device 26 controls the extreme movement of both of these deflections and is secured to floor pan 28.

Figure 3:
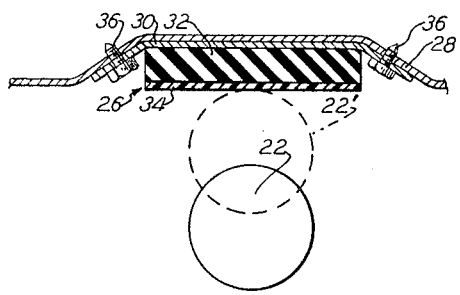
FIGURE 3 is a sectional view taken along section lines 3—3 of FIGURE 2.

As seen in FIGURE 3, the drive shaft limiting device includes a sheet metal supporting element 30 to which a rectangular rubber block 32 has been bonded. A layer of low friction plastic material, such as "Teflon" or nylon, is cemented to the lower face of the rubber block 32. The "Teflon" or low friction plastic layer is identified by the reference numeral 34. The drive shaft limiting device 26 is secured to the floor pan 28 by a pair of sheet metal screws 36. The floor pan 28 is supported between the side rails of the frame 14.

Figure 2:
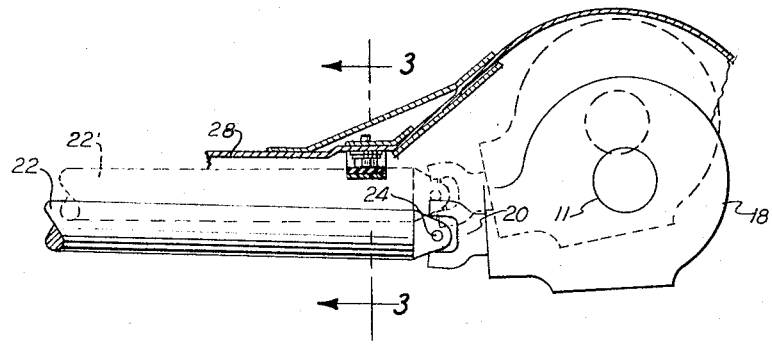
FIGURE 2 is a side elevational view corresponding to FIGURE 1, slightly enlarged, showing the deflected position of the drive shaft and differential housing.

As seen in FIGURES 1, 2 and 3, the drive shaft limiting device 26 is secured to the floor pan 28 in vertical alignment with the drive shaft 22 and just forwardly of the universal joint 24. During normal jounce and rebound movement of the wheels 10, deflection is not sufficient to cause the shaft 22 to strike the limiting device 16. On extreme jounce and heavy acceleration, however, the drive shaft 22 will be deflected to the dotted-line position identified by the reference numeral 22′ in FIGURES 2 and 3. It is noted that the drive shaft will strike the Teflon face and cause compression of the rubber block 32 which is positioned behind it. Compression of the rubber will gently, but firmly resist further deflection of the shaft 22. Due to the low friction nature of the facing 34, the drive shaft 22 will be free to rotate and will not scuff the surface. In order to promote the longest possible life for the limiting device 26, it is recommended that the exterior of the drive shaft 22 in the region of the limiting device 26 be provided with a smoothly machine surface to reduce abrasion of the plastic layer 34.

The device of the present invention is particularly characterized by its simplicity of construction and by its functional advantage of increasing the free travel of the drive shaft and the differential housing. The heavy brackets and striker plates usually associated with the nose bumper of the differential are conveniently eliminated.

The foregoing description presents the presently preferred embodiment of this invention. Modifications and alterations may occur to those skilled in the art that will come within the scope and spirit of the following claims.

We claim:

1. In a motor vehicle having chassis support structure, a pair of road wheels, a rigid axle housing interconnecting said road wheels, a pair of leaf springs connecting said axle housing to said support structure, a differential centrally situated in said axle housing, a pinion shaft extending forwardly from said differential, a rotatable drive shaft connected to said pinion shaft by a universal joint, a floor pan secured to said chassis support structure, a motion limiting device secured to said floor pan in vertical alignment with said drive shaft and near its rear extremity, said motion limiting device comprising a resilient rubber block having a low friction plastic material secured to its lower face and spaced apart from said drive shaft.

2. In a motor vehicle having chassis support structure, a pair of road wheels, a rigid axle housing interconnecting said road wheels, a pair of leaf springs connecting said axle housing to said support structure, a differential centrally situated in said axle housing, a pinion shaft extending forwardly from said differential, a rotatable drive shaft connected to said pinion shaft by a universal joint, a floor pan secured to said chassis support structure, a resilient motion limiting device secured to said floor pan in vertical alignment with said drive shaft and near its rear extremity, said device being normally spaced apart from said drive shaft and constructed to limit the upward movement of said drive shaft.

3. In a motor vehicle having chassis support structure, a pair of road wheels, a rigid axle housing interconnecting said road wheels, a pair of leaf springs connecting said axle housing to said support structure, a differential gear unit centrally situated in said axle housing, a forwardly mounted transmission, a one piece rotatable drive shaft connected to said gear unit at one end and to said transmission at its other end, a resilient motion limiting device secured to said support structure in vertical alignment with said drive shaft, said device being situated between the rear of said shaft and the midpoint of said shaft, said device being normally spaced apart from said drive shaft and constructed to limit the upward movement of said drive shaft.

4. In a motor vehicle having chassis support structure, a pair of road wheels, a rigid axle housing interconnecting said road wheels, suspension means connecting said axle housing to said support structure for jounce and rebound movement, a differential gear unit situated in said axle housing, a forwardly mounted transmission, a one piece drive shaft connected to said differential gear unit at one end and to said transmission at its other end, a motion limiting device secured to said support structure in vertical alignment with said drive shaft, said device being situated between the rear of said shaft and the midpoint of said shaft, said motion limiting device comprising a resilient block having a low friction material secured to its lower face and spaced apart from said drive shaft.

5. In a motor vehicle having chassis support structure, a pair of road wheels, a rigid axle housing interconnecting said road wheels, suspension means connecting said axle housing to said support structure for jounce and rebound movement, a differential centrally situated in said axle housing, a rotating drive shaft connected to said differential, motion limiting device secured to said support structure in vertical alignment with said drive shaft and near its rear extremity, said motion limiting device comprising a resilient means having a low friction lower face normally spaced apart from said drive shaft.

6. In a motor vehicle having chassis support structure, a pair of road wheels, a rigid axle housing interconnecting said road wheels, suspension means connecting said axle housing to said support structure for jounce and rebound movement, a differential centrally situated in said axle housing, a drive shaft connected to said differential, motion limiting device secured to said support structure in vertical alignment with said drive shaft and near its rear extremity, said motion limiting device comprisng a resilent means normally spaced apart from said drive shaft.

7. In a motor vehicle having chassis support structure, a pair of road wheels, a rigid axle housing interconnecting said road wheels, suspension means connecting said axle housing to said support structure for jounce and rebound movement, a differential centrally situated in said axle housing, a drive shaft connected to said differential, a resilient motion limiting device secured to said support structure in vertical alignment with said drive shaft and near its rear extremity, said device being normally spaced apart from said drive shaft and constructed to limit the upward movement of said drive shaft.

References Cited by the Examiner

UNITED STATES PATENTS

| 1,783,424 | 12/1930 | Hewitt | 180—73 |
| 2,198,353 | 4/1940 | Tjaarda | 180—73 |
| 2,631,682 | 3/1953 | Gale | 180—73 |
| 3,161,253 | 12/1964 | Burton | 180—70 |

A. HARRY LEVY, *Primary Examiner.*